United States Patent [19]
Takahashi

[11] Patent Number: 5,949,754
[45] Date of Patent: Sep. 7, 1999

[54] COMMUNICATION CONTROL METHOD IN NETWORK SYSTEM BASED ON DUPLEX LOOP TRANSMISSION SYSTEM

[75] Inventor: Toshiya Takahashi, Tokyo, Japan

[73] Assignee: Mitsubishi Denki Kabushiki Kaisha, Tokyo, Japan

[21] Appl. No.: 08/754,591

[22] Filed: Nov. 25, 1996

[30] Foreign Application Priority Data

Sep. 10, 1996 [JP] Japan ..................................... 8-238872

[51] Int. Cl.[6] .......................... H04L 12/00; G05B 19/04
[52] U.S. Cl. .......................... 370/222; 370/248; 370/294
[58] Field of Search .......................... 370/217, 222–224, 370/228, 242–245, 248, 252, 276, 294; 371/20.6

[56] References Cited

U.S. PATENT DOCUMENTS 4,633,246  12/1986  Jones et al. .............................. 370/224
5,282,237  1/1994  Babu et al. .............................. 370/224

FOREIGN PATENT DOCUMENTS 1-145701  6/1989  Japan .

*Primary Examiner*—Melvin Marcelo
*Attorney, Agent, or Firm*—Sughrue, Mion, Zinn, Macpeak & Seas, PLLC

[57] ABSTRACT

A network manager, when a transmission is requested from any FA equipment under control by the network manager, sets a flag indicating a loop direction for transmission in a transmission frame and transmits the transmission frame to other stations, and when network controllers receive the transmission frame with a flag indicating the loop direction set therein, the network controllers check whether the loop through which the transmission frame was actually received is the same as that indicated by the flag in the received transmission frame or not, and if it is determined that the loop through which the transmission frame was actually received is different from that indicated by the flag above, the network controllers send the transmission frame including an error report indicating the loop direction to the network manager.

10 Claims, 13 Drawing Sheets

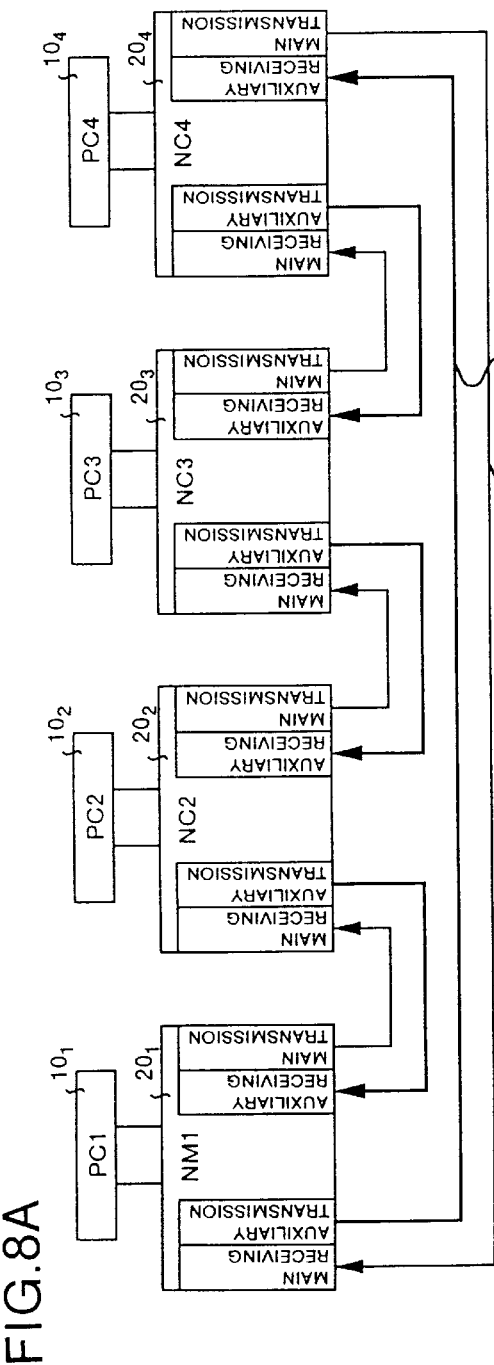
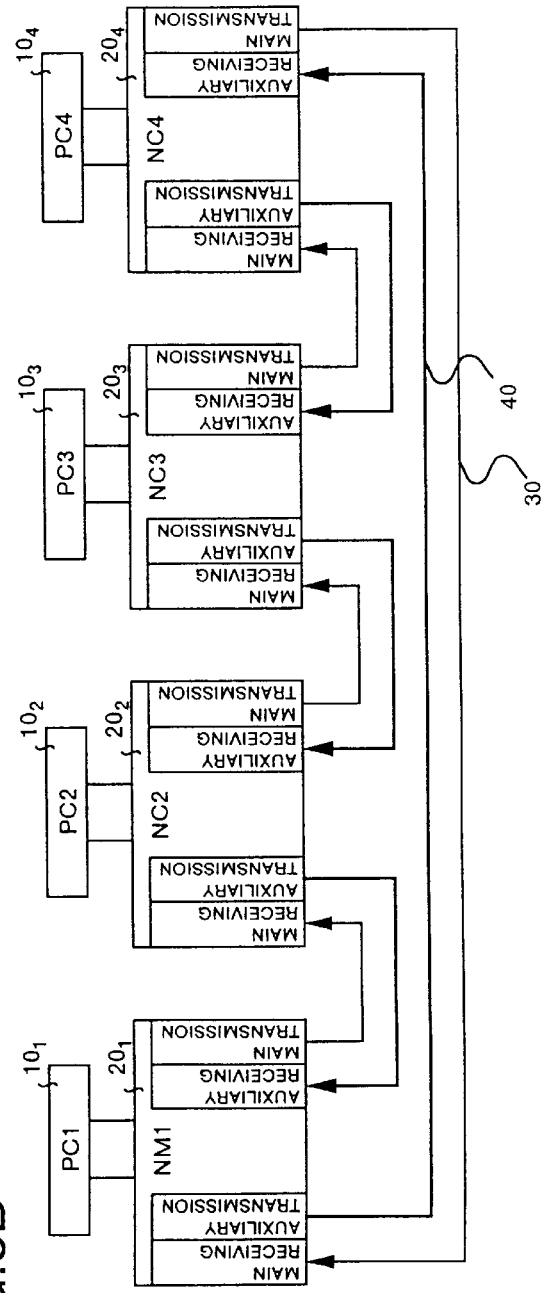
FIG.8A
FIG.8B

COMMUNICATION CONTROL METHOD IN NETWORK SYSTEM BASED ON DUPLEX LOOP TRANSMISSION SYSTEM

FIELD OF THE INVENTION

The present invention relates to a communication control method in a network, and more specifically to a communication control method in a network based on a duplex loop transmission system in which a plurality of factory automation (FA) equipment such as programmable controllers are connected to each other with duplex loop configuration.

BACKGROUND OF THE INVENTION

FIG. 8A and FIG. 8B show configuration of a network system based on a duplex transmission system respectively. In this network, network units $20_1$ to $20_4$ are connected to four units of programmable controller (described PC hereinafter) $10_1$ to $10_4$ respectively, and the network units $20_1$ to $20_4$ are connected to each other with a duplex loop consisting of a main loop transmission path 30 and an auxiliary loop transmission path 40.

Of the network units $20_1$ to $20_4$, a network unit $20_1$ functions as an administrative station, and in the following description the network controller $20_1$ is sometimes described as a network manager (abbreviated as NM). In contrast, network units $20_2$ to $20_4$ are normal stations, and in the following description the network units $20_2$ to $20_4$ are sometimes described as a network controller (abbreviated as NC).

The NM $20_1$ not only transmits signals to and receives signals from each of the PCs $10_1$ to $10_4$ but also transmits network parameters as to how many stations the network comprises, what type of communications is to be executed or the like to the NCs $20_2$ to $20_4$, and checks whether the network is operating correctly or not, while the NCs $20_2$ to $20_4$ transmit signals to and receive signals from the PCs $10_1$ to $10_4$ under management by the NC $20_1$.

The difference between the NM $20_1$ and NCs $20_2$ to $20_4$ is whether software mainly relating to a network management function has been installed therein or not, and the hardware configuration is identical.

FIG. 9 shows hardware configuration of a programmable controller having a network communication function. The PC 10 (PCs $10_1$ to $10_4$) comprises a CPU 11 executing sequence processing or processing for communications with the network unit 20 (NMs $20_1$, NCs $20_2$ to $20_4$) or the like, a ROM 12 for storing a sequence program or a control program therein, a RAM 22 as a work memory handling various types of data, and external interface (I/F) 14 such as external input/output, serial interface, an LED, or a switch.

The network unit 20 comprises a CPU 21 executing communications with other stations or communication with the PC 10 for the network manager, a two-port RAM 22 which is a memory exchanging data or executing handshaking with the PC 10 for the network manager, a ROM 23 for storing therein processing programs such as communication programs, a RAM 24 as a work memory handling various types of data, and a network interface 25 connected to other stations with duplex loop configuration.

Connected to the network interface 25 are a main loop transmission cable 31 and a main loop receiving cable 32 each constituting a main transmission path 30, and an auxiliary loop transmission cable 41 and an auxiliary loop receiving cable 42 each constituting an auxiliary loop transmission path 40. Each of these cables is a two-core pair cable consisting of an optical cable or the like, and the main loop transmission cable 31 forms a pair with the auxiliary loop receiving cable 42, and the auxiliary loop transmission cable 41 forms a pair with the main loop receiving cable 32.

FIG. 10 shows an example of memory configuration of transmission/receiving interface in the two-port RAM 22 of the conventional network unit 20. The two-port RAM 22 comprises a transmission/receiving start flag area for storing therein a transmission/receiving start flag indicating whether an NM or an NC is ready for communications with other stations or not, a status area for storing a status indicating abnormality when transmission/receiving is stopped, a network parameter area for storing network parameters indicating how many stations the network comprise, what type of communications is to be executed, or the like, a transmit buffer for transmission from a PC, a receive buffer for receiving from an NM or an NC, each allocated therein.

Next description is made for operations in the conventional type of network.

At first description is made for the processing performed by the PC 10 with reference to FIG. 11. The PC 10 executes the initial processing for checking whether the RAM 13, external I/F 14, and network unit 20 are operating correctly or not (step ST141), whether the connected network unit 20 is a network manager or a network controller (step ST142).

As the network unit connected to the PC $10_1$ is a network manager (NM $20_1$), the PC $10_1$ executes network parameter transmission processing for writing network parameters in a network parameter area of the two-port RAM 22 (step ST143). Then the network manager monitors the transmission/receiving start flag area of the two-port RAM 22, and determines whether transmission or receiving has been started or not according to whether the transmission/receiving start flag has been turned ON or not (step ST145).

If transmission or receiving has been started (step ST145 affirmative), transmission to or receiving from other stations is executed through a transmit buffer or a receive buffer allocated to the two-port RAM 22. Then the network manager executes processing for sequence control which is to be executed by a PC (step ST149).

On the contrary, if it is determined that the transmission/receiving flag has been turned OFF (step ST145 negative), the network manager checks contents of the status area of the two-port RAM 22 (step ST147), and if any abnormality is detected (step ST147 affirmative), appropriate processing for troubleshooting is executed (step ST148), and then executed is the sequence control processing to be executed by a PC (step ST149), and on the other hand if any abnormality is not detected (step ST147 negative), the network manager immediately executes the sequence control processing which is originally to be executed by a PC (step ST149).

If the sequence control processing is finished, system control returns to step ST145, and by repeating the processing sequence, the network manager executes sequence control as well as transmission to or receiving from other stations.

As the network controllers (NC $10_2$ to $10_4$) are connected to the PCs $10_2$ to $10_4$ respectively, in the PCs $10_2$ to $10_4$, a controller is selected according to a result of determination in step ST142, network parameters are fetched from the network parameter area of the two-port RAM 22 (step ST144). Then, like in the PC $10_1$, processing is executed successively from the step ST145, and like in the PC $10_1$, sequence control as well as transmission to or receiving from other stations are executed.

Next description is made for operations of the network manager (NM) 20 with reference to a flow chart shown in FIG. 12.

The NM $20_1$ executes the initial processing such as checking whether the network I/F 25 is operating correctly or not (step ST100), and sets the transmission/receiving start flag stored in the transmission/receiving start flag area of the two-port RAM 22 to OFF (step ST101).

Then the NM $20_1$ makes determination as to whether both the main and auxiliary loop cables are available for communication with other stations due to disconnection of a line or not (step ST102), and if it is determined that the line is not available for communication with other stations due to a failure such as disconnection of the line or for other reason (step ST102 affirmative), the NM $20_1$ sets a line disconnection fault in the status area of the two-port RAM 22 (step ST106), also sets the transmission/receiving start flag in the two-port RAM 22 to OFF (step ST107), and repeats the processing sequence from step ST102 until the line is recovered to the normal state.

If it is determined that the status is normal (step ST102 negative), the network parameters stored in the network parameter area of the two-port RAM 22 are transmitted from the PC $10_1$ to other stations (step ST104).

Then, to inform the PC $10_1$ of the fact that communication with other stations has been started, the transmission/receiving start flag of the two-port RAM 22 is set to ON (step ST105).

Then whether a request for transmission has been issued from the PC $10_1$ or not is checked in the transmit buffer of the two-port RAM 22 (step ST108), and if it is determined that a request for transmission has been issued (step ST108 affirmative), processing for transmission is executed (step ST109), and if it is determined that a request for transmission has not been issued (step ST108 negative), transmission processing is not executed, and system control shifts to step ST110.

Then checking is made as to whether a transmission frame has been received from other stations or not (step ST110), and if it is determined that a transmission/receiving frame has been received (step ST110 affirmative), the receiving processing for setting the received data in a receive buffer of the two-port RAM 22 is executed (step ST111), and if it is determined that any transmission frame has not been received from other stations (step ST110 negative), the processing for receiving is not executed, and system control shifts to step ST112.

Also checking is made as to whether any abnormality has been generated due to a failure such as disconnection of a line during transmission or receiving or not (step ST112), and if it is determined that any abnormality has not been generated (step ST112 negative), then system control returns to step ST108, and if it is determined that any abnormality has been generated (step ST112 affirmative), a flag indicating a line disconnection fault is set in the status area of the two-port RAM 22 (step ST106) with the transmission/receiving start flag in the two-port RAM 22 set to OFF (step ST107), and the processing sequence from the step ST102 is repeated until the line is recovered to the normal state.

Then description is made for operations of the network controllers (NC) $20_2$ to $20_4$ with reference to the flow chart shown in FIG. 13.

The network controllers $20_2$ to $20_4$ execute the initial processing such as checking as to whether the RAM 24 and network I/F 25 are operating correctly or not (step ST120), and set the transmission/receiving start flag stored in the transmission/receiving start flag area of the two-port RAM 22 to OFF (step ST121).

Then the network controllers check whether both the main and auxiliary loop lines are unavailable for communications with other stations due to such a failure as disconnection of a line or not (step ST122), and if it is determined that communication with other stations can not be executed due to such a failure as disconnection of a line (step ST122 affirmative), the network controllers set a flag indicating line disconnection fault in the status area of the two-port RAM 22 (step ST125) and also set the transmission/receiving start flag in the two-port RAM 22 to OFF (step ST126), and repeats the processing sequence from the step ST122 until the line is restored to the normal state.

If it is determined that the lines are in the normal state (step ST122 negative), the network controllers check whether network parameters from the NM $20_1$ have been received or not (step ST124), and if it is determined that the parameters have not been received yet (step ST124 negative), then system control returns to step ST122.

On the contrary, if it is determined that the parameters have been received (step ST124 affirmative), the network controllers execute the network parameter receiving processing for storing the network parameters in the network parameter area of the two-port RAM 22, and deliver the parameters to a PC connected to each of the network controllers (step ST127).

Then to report the fact that communication with other stations has been started to the PC connected to each network controller, the transmission/receiving start flag in the two-port RAM 22 is set to ON (step ST128).

Then the network controllers check whether a transmission frame has been received from other stations or not (Step ST129), and if it is determined that a transmission frame has been received (step ST122 affirmative), the network controllers execute the receiving processing for setting the received data in the receive buffer of the two-port RAM 22 (step ST130), and if it is determined that a transmission frame has not been received (step ST129 negative), the network controllers do not execute the receiving processing, and system control shifts to the step ST131.

Then the network controllers check whether a request for transmission has been issued from a PC connected to each of the network controllers by checking the transmit buffer of the two-port RAM 22 (step ST131), and if it is determined that a request for transmission has been issued (step ST131 affirmative), then network controllers execute the transmitting processing (step ST132), and if it is determined that a request for transmission has not been issued (step ST131 negative), the network controllers do not execute the transmitting processing with the system control shifted to the step ST133.

Then the network controllers check whether any abnormality has been generated due to such a failure as disconnection of a line during the communications described above or not (step ST133), and if it is determined that the line is in the normal state (step ST133 affirmative), system control returns to the step ST129, and if it is determined that any abnormality has been generated, the network controllers set a flag indicating a line disconnection fault in the status area of the two-port RAM 22, set the transmission/receiving start flag in the two-port RAM 22 to OFF (step ST126), and repeat the processing sequence from the step ST122 until the line is restored to the normal state.

In the conventional type of network system, checking is not executed as to through which of a main loop and an auxiliary loop a transmission frame has been received, and for this reason, as shown in FIG. 8B, even if a pair cable A between the NC $20_3$ and NC $20_4$, consisting of a main loop transmission cable 31 and an auxiliary receiving table 42 and a pair cable B between the NC $20_4$ and NM $20_1$ consisting of an auxiliary transmission cable 41 and a main receiving cable 32 are connected to the NC $20_4$ erroneously, it can not be detected.

Even if the detection is impossible, not error is generated in the conventional system as described above, and normal communications can be executed, so that any problem does not occur, but generally in communications based on duplex loop configuration, if a main loop is disconnected, communication is executed only through the auxiliary loop. Also it is well known that, if power supply for any station is disconnected, a fail-safe function enabling loop back in stations before and behind the failed station is used.

Such functions as described above naturally assume that the main and auxiliary loops are connected correctly, and if there are erroneous connections at a plurality of sections, such a problems as that the loop-back function does not work correctly occurs.

For this reason, to check that the main and auxiliary loops are connected correctly, markings are provided on cables or at the necessary places when the system is constructed, and visual checking for the markings is required, which is troublesome.

SUMMARY OF THE INVENTION

It is an object of the present invention to obtain a communication control method, especially a communication control method nor requiring any specific hardware configuration in a network system based on a duplex loop transmission system, in which, in a case where cables for main and auxiliary loops are connected correctly, transactions can be continued without being affected by normal communications, and in a case where cables for the main and auxiliary loops are not connected correctly, the loop fault can be detected, normal communications by a programmable controller can be stopped, and further an abnormal station in the loop direction, to which a cable is conceivably connected in an erroneous state, can be checked and this fact can be reported to a programmable controller, and further in a case where any abnormal station in the loop direction is detected, normal communications of the programmable controller can quickly be resumed, by periodically testing whether cable connection for all the stations has been restored to the normal state or not, at a point of time when the cable connection is restored to the normal state.

In the communication control method according to the invention described above, it is possible to check whether a cable is correctly connected thereto or not by checking a loop direction when an ordinary transmission frame is received.

In the communication control method according to the invention described above, when a cable is not correctly connected thereto, the network manager and all the network controllers can disable a request for transmission/receiving from factory automation (FA) equipment.

In the communication control method according to the invention described above, the number of a faulty station is reported to the FA equipment connected to the network manager, so that it is possible to check which station is not correctly connected thereto with the cable.

In the communication control method according to the invention described above, the number of a faulty station is reported to the FA equipment connected to the network manager, so that it is possible to check which station is not correctly connected thereto with the cable.

In the communication control method according to the invention described above, it is possible to check whether connection of all the stations with the cable is corrected or not by periodically executing a loop direction test after the loop error is recognized.

In the communication control method according to the invention described above, when the connection of all the stations with the cable is corrected, an ordinary communication can quickly be restarted by instructing the fact that the error in the loop direction is corrected to the FA equipment.

Other objects and features of this invention will become understood from the following description with reference to the accompanying drawings.

BRIEF DESCRIPTION OF THE DRAWINGS

FIG. 8A is a view showing configuration of a network system based on a duplex loop transmission system in which loops are correctly connected to each other;

FIG. 8B is a view showing configuration of a network system based on a duplex loop transmission system in which loops are incorrectly connected to each other;

DESCRIPTION OF THE PREFERRED EMBODIMENTS

Detailed description is made for Embodiments of the present inventions with reference to the related drawings.

Figure 9:
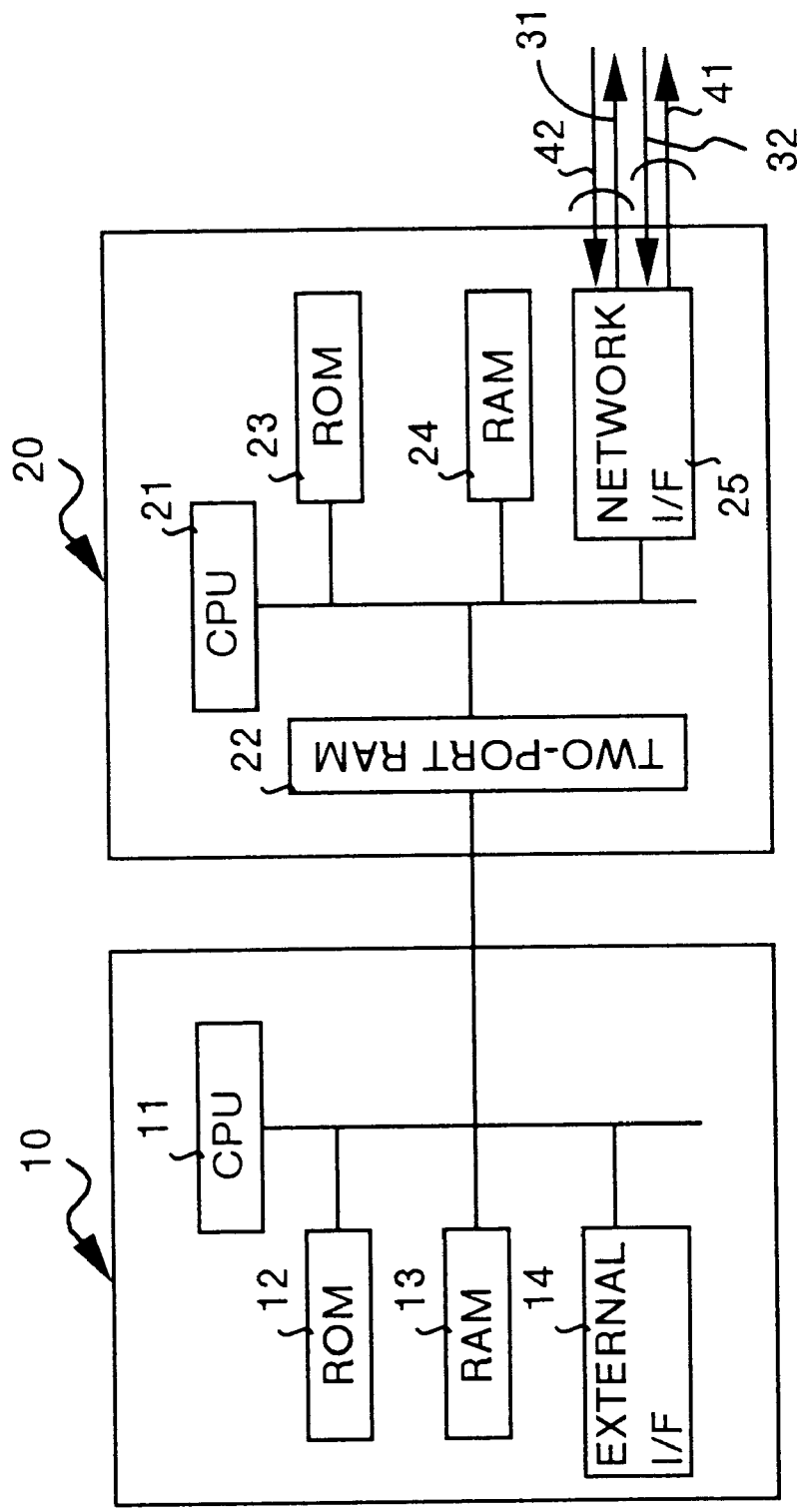
FIG. 9 is a block diagram showing configuration of hardware of a programmable controller and a network unit.
Figure 10:
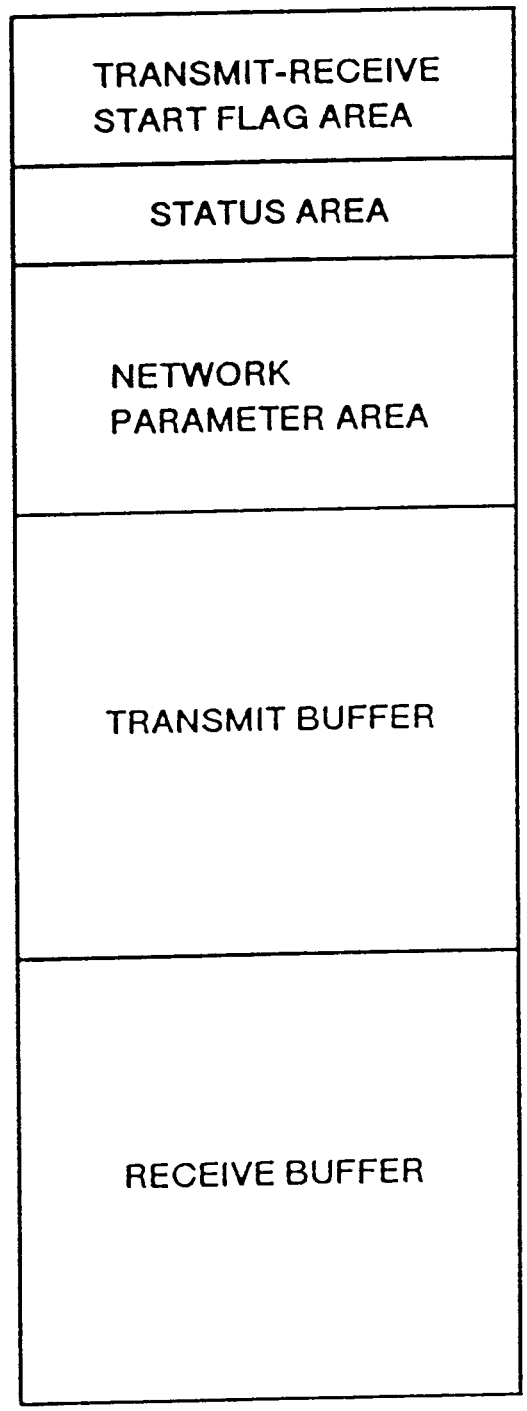
FIG. 10 is an explanatory view showing memory configuration of a two-port RAM in a network system based on a conventional type of duplex loop transmission system.
Figure 11:
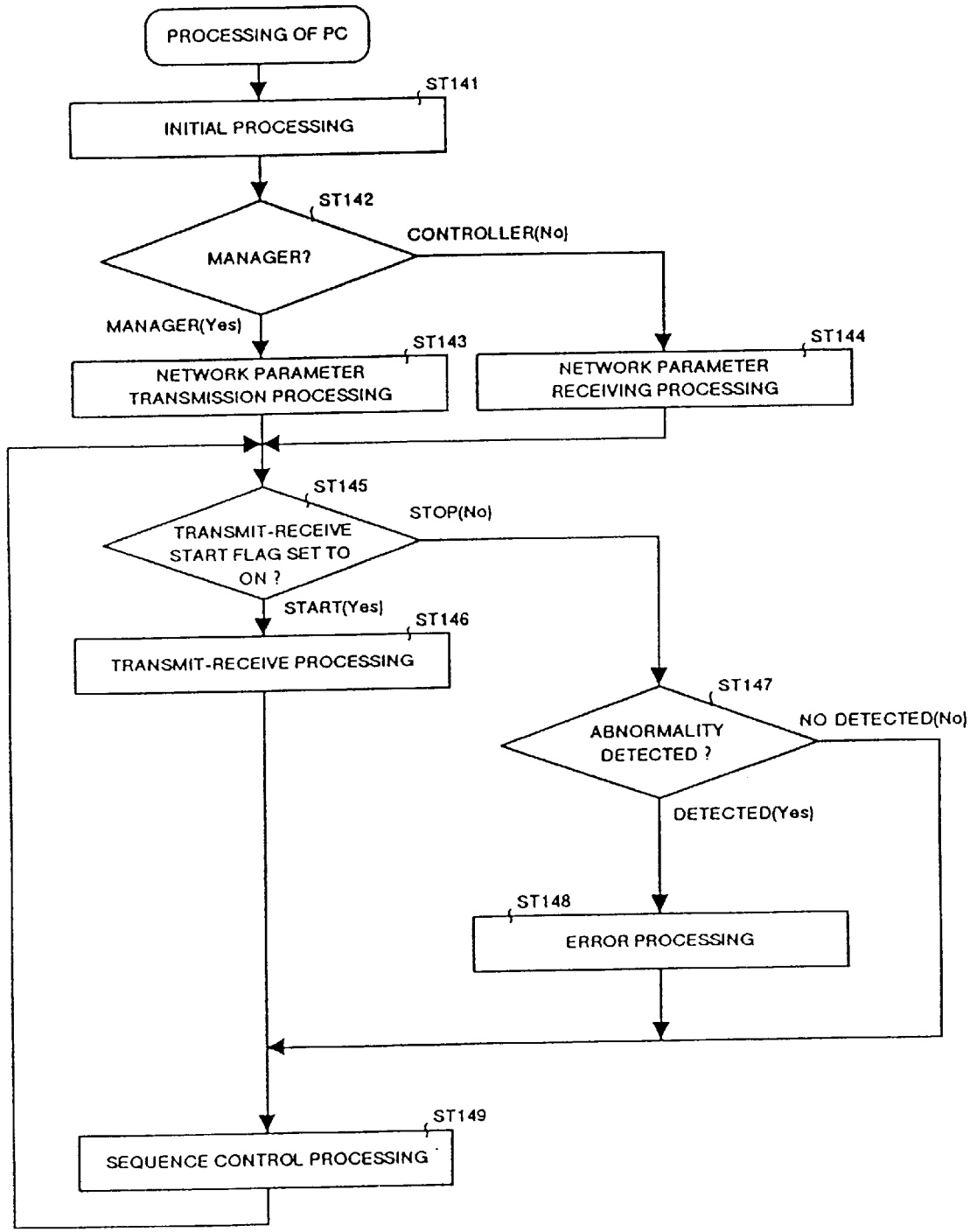
FIG. 11 is a flow chart showing processing operations of a programmable controller in the network system based on the conventional type of duplex loop transmission system.
Figure 12:
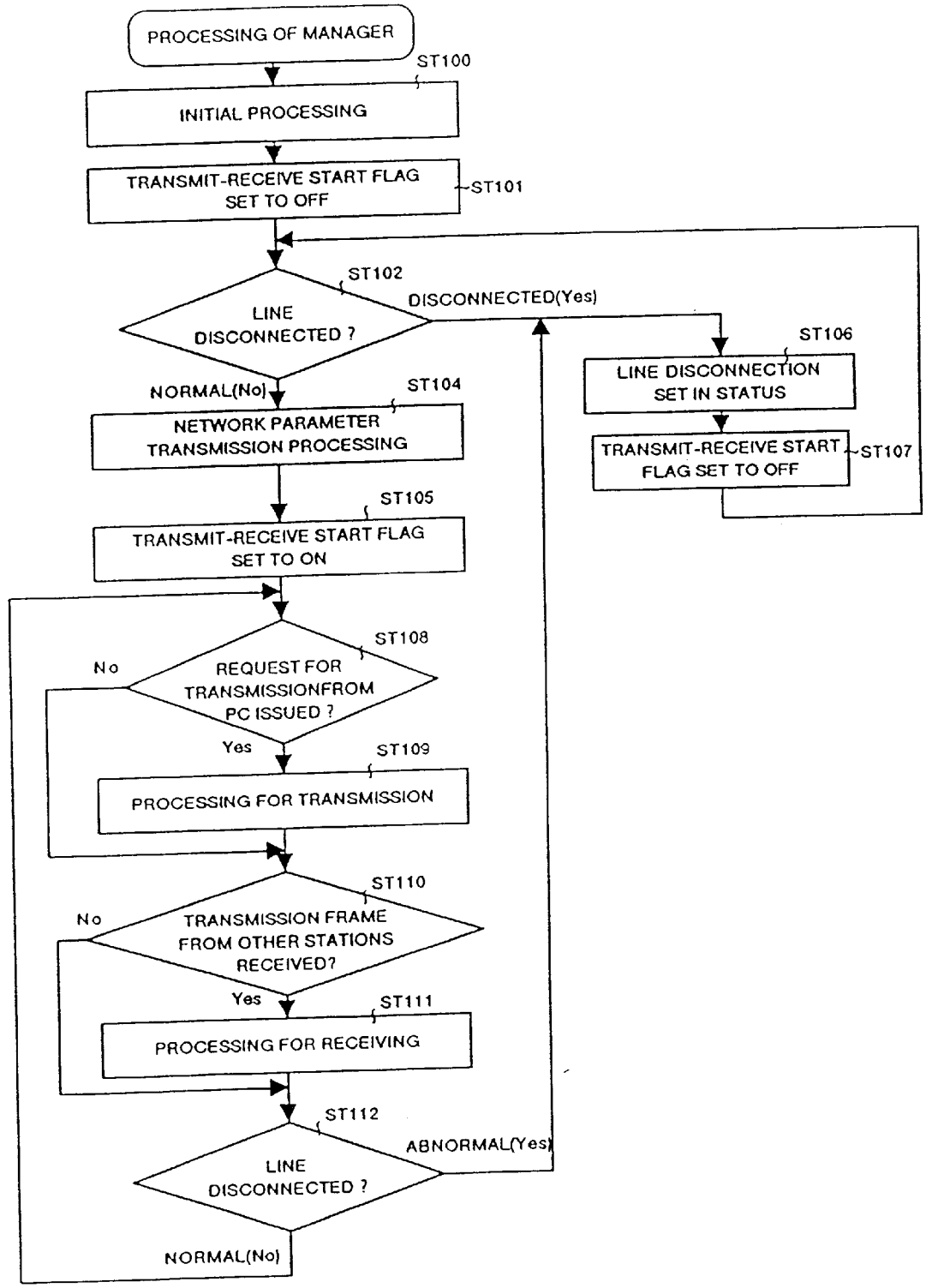
FIG. 12 is a flow chart showing processing operations of a network manager in the network system based on the conventional type of duplex loop transmission system.
Figure 13:
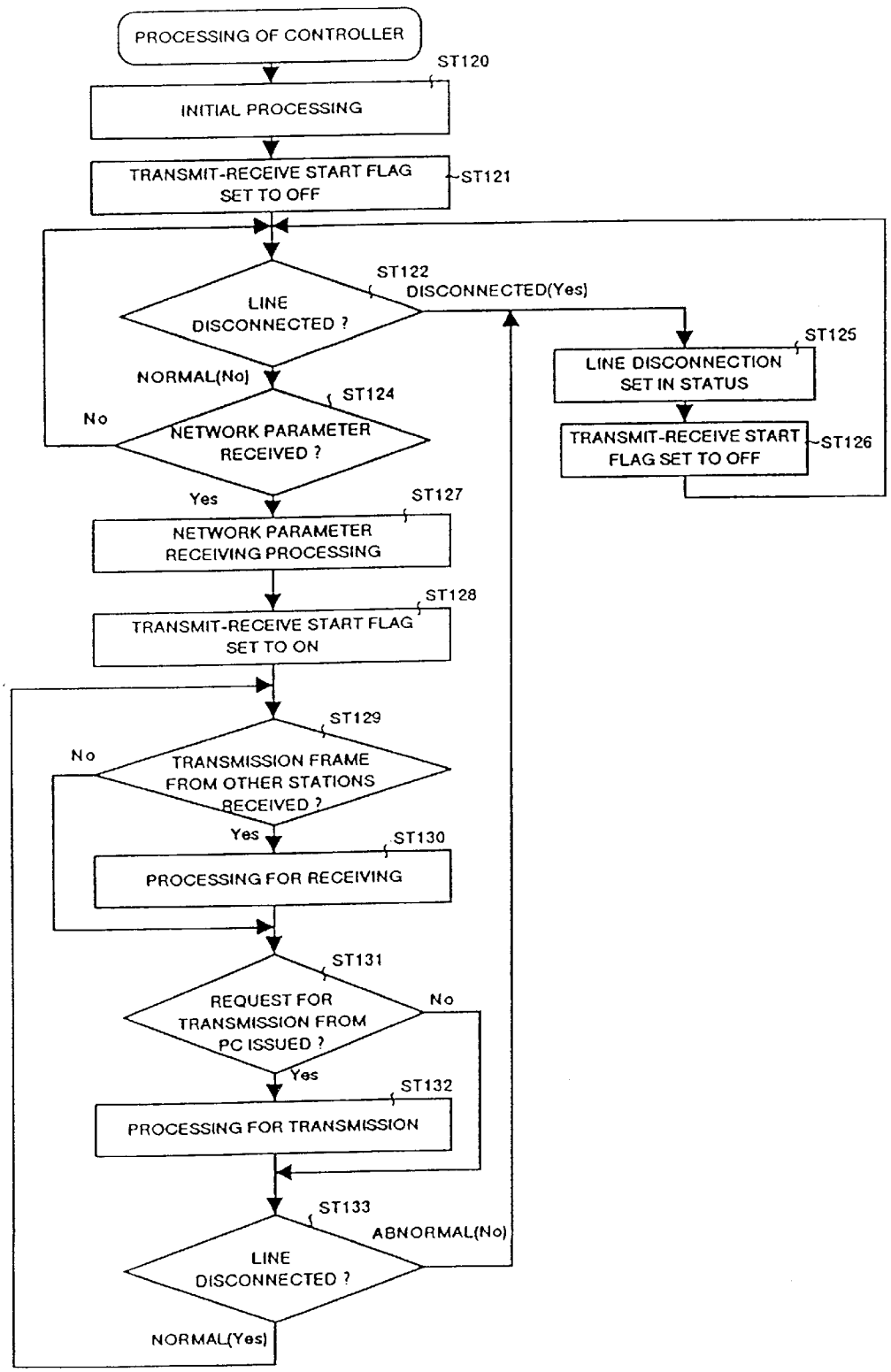
FIG. 13 is a flow chart showing processing operations of a network controller in the network system based on the conventional type of duplex loop transmission system.

Configuration of hardware of a network unit used in the method of controlling communications of a network system according to Embodiment 1 may be the same as that based on an example of the conventional technology shown in FIG. 9, and comprises a CPU 21 for processing of communication with other stations and executing communication with a PC 10 in a station, a two-port RAM 22 which is a memory for storing therein data transacted to and from the PC 10 in the station as well as for hand shaking with the PC 10, a ROM 23 for storing a processing program such as a communication program or the like, a RAM 24 as a work memory for handling various types of data, and a network interface (I/F) 25 connected to other stations with duplex loop arrangement.

Figure 1:
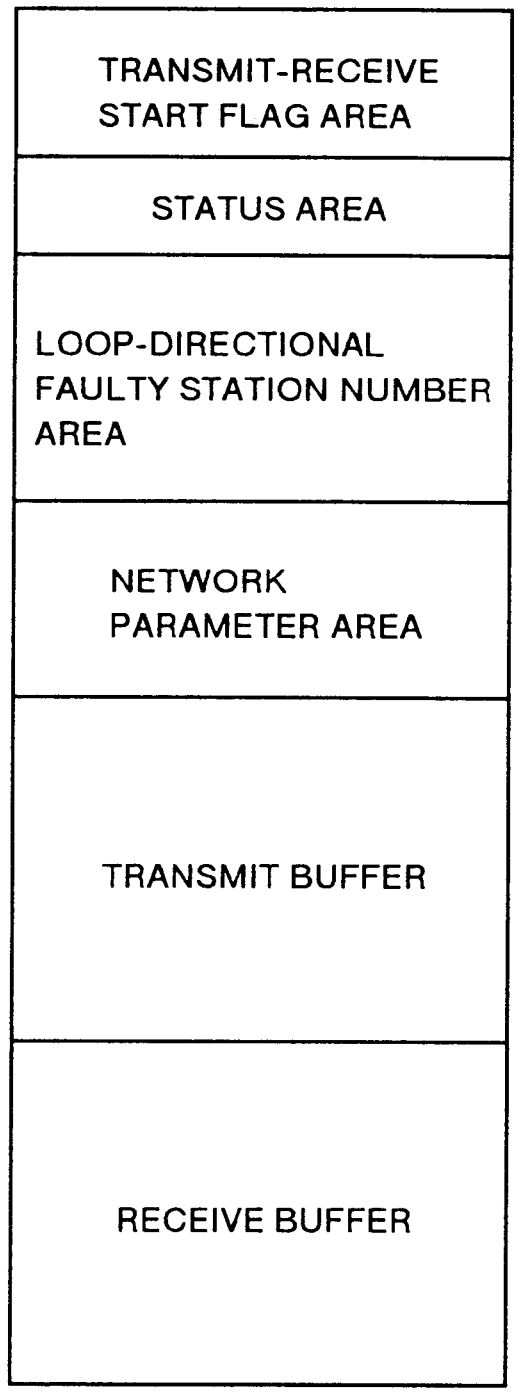
FIG. 1 is an explanatory view showing memory configuration of a two-port RAM in a network unit used for executing the communication control method according to the present invention.

FIG. 1 shows an example of memory configuration of the two-port RAM 22 of a network unit in Embodiment 1. A loop-directional faulty station number area for writing therein a loop-directional faulty station indicating a number of station in which an error in the loop direction according to a status in a status area is shown is allocated to the two-port RAM 22 in addition to a transmission/receiving start flag area, a status area, a network parameter area, a transmit buffer, and a receive buffer each the same as that based on the conventional technology.

The communication control method in a network system according to the present invention comprises the processing steps described below.

(1) A managing station (a network manager $20_1$), when it receives a request for transmission, sets a flag indicating a transmitting loop direction (a main loop, an auxiliary loop) in a transmission frame, and transmits the frame to other station.

(2) An ordinary station (network controllers $20_2$ to $20_4$) checks, when it receives the transmission frame in which the flag indicating a loop direction is set from the managing station, coincidence between the loop actually received and the loop direction indicated by a flag indicated in the received transmission frame, and transmits a transmission frame including an error report indicating the number of station and the loop direction in which an error is detected to the network manager $20_1$ to alert it in a case where the loop actually received is different from the loop direction indicated by the flag.

(3) The network manager $20_1$ receives the transmission frame including an error report from any of the network controllers $20_2$ to $20_4$, or checks coincidence between the loop actually received and the loop direction indicated by a flag indicated in the received transmission frame, and in a case where the actually received loop is different from a loop direction indicated by the flag, the network manager disables a request for transmission/receiving from a programmable controller, and reports the number of a faulty station to the programmable controller.

(4) Also the network manager $20_1$ receives the transmission frame including an error report from any of the network controllers $20_2$ to $20_4$, or, in a case where the actually received loop is different from the loop direction indicated by the flag, transmits a parallel-off instructing transmission frame for reporting an error in the cable connection of the network and the number of a faulty station in the network to all the network controllers $20_2$ to $20_4$.

(5) The network controllers $20_2$ to $20_4$ disables a request for transmission from a programmable controller when it receives the parallel-off instructing transmission frame from the network manager $20_1$, and reports the number of faulty station to the programmable controller.

(6) The network manager $20_1$ transmits a loop direction testing transmission frame for periodically executing testing as to whether a wiring fault has been corrected for each line to the network controllers $20_2$ to $20_4$ after it transmits the parallel-off instructing transmission frame to the network controllers $20_2$ to $20_4$.

(7) Each of the network controllers $20_2$ to $20_4$ checks the loop direction when it receives the loop direction testing transmission frame for each line from the network manager $20_1$, and transmits the loop direction testing result transmission frame indicating a result of the check to the network manager $20_1$.

(8) The network manager $20_1$ checks the loop direction testing result transmission frame for each line of the network controllers $20_2$ to $20_4$, and transmits a parallel-on instructing transmission frame to each of the network controllers $20_2$ to $20_4$ and restarts a request for transmission/receiving from the programmable controller in a case where the error in all the stations and the loop direction of a station has been corrected.

(9) When each of the network controllers $20_2$ to $20_4$ receives the parallel-on instructing transmission frame, it restarts a request for transmission from the programmable controller.

Figure 2:
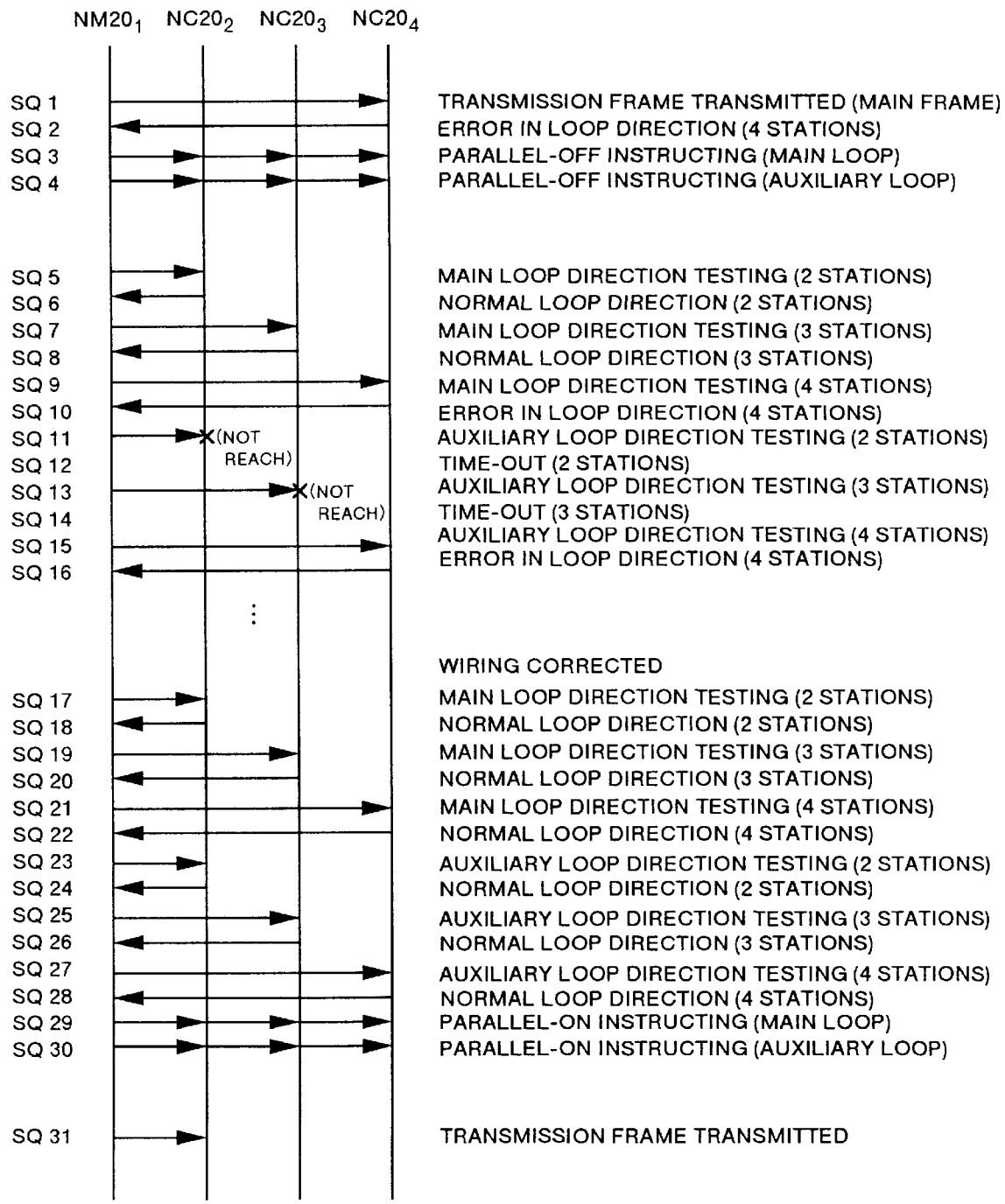
FIG. 2 is an explanatory view showing a sequence of transmission/receiving in the communication control method according to the present invention.

Next description is made for flows of transmission/receiving between the NM $20_1$ and the NC $20_2$, NC $20_3$, and NC $20_4$ when any error occurs in the loop direction shown in FIG. 8B with reference to the view showing the operational sequence in FIG. 2.

At first, an ordinary transmission frame is transmitted from the NM $20_1$ to the NC $20_4$ in sequence SQ1. A flag indicating a loop direction is included in the transmission frame, and in a case where the frame is sent by, for instance, a main loop, the main loop is indicated in the flag, and it is sent through the main loop.

Then, in sequence SQ2, the NC $20_4$ receives a transmission frame from the NM $20_1$ through an auxiliary loop due to erroneous connection of the cable, so that an error occurs in the loop direction, and the NC $20_4$ transmits a transmission frame including therein a loop direction error report to the NM $20_1$.

In the example shown in FIG. 8B, an error in the loop direction occurs only in the NC $20_4$, so that, in sequence SQ3, the NM $20_1$ transmits a parallel-off instructing transmission frame to all the network control stations (ordinary stations) through the main loop to disable transmission to or receiving from other stations. Also in sequence SQ4, the NM $20_1$ transmits a parallel-off instructing transmission frame to all the network control stations (ordinary stations) through the auxiliary loop to disable transmission therefrom or receiving thereby.

At this point of time, the $PC10_1$, $PC10_2$, $PC10_3$, and $PC10_4$ connected to the NM $20_1$, NC $20_2$, NC $20_3$, and NC $20_4$, respectively disable ordinary transmission and receiving, and then the NM $20_1$ starts a loop direction testing.

At first, in sequence SQ5, the NM $20_1$ transmits a loop direction testing transmission frame to the NC $20_2$ using the main loop, and in sequence SQ6, the NC $20_2$ transmits a loop direction testing result transmission frame, in this case, a normal result, to the NM $20_1$. Similarly, in sequences from sequence SQ7 to sequence SQ10, the NC $20_3$ and NC $20_4$ are tested respectively. In this case, the NC $20_3$ transmits a normal result thereto, and the NC $20_4$ transmits a result of the test in which an error has occurred therein to the NM $20_1$.

Similarly, in sequences from sequence SQ11 to sequence SQ16, the NC $20_2$, NC $20_3$ and NC $20_4$ are tested respectively using the auxiliary loop. The NM $20_1$ also tests a received direction of a station when it tests the loop direction in each of the cases respectively. In this case, the testing transmission frame does not reach the NC $20_2$ and the NC $20_3$, so that a time-out occurs in the test, in contrast the NC $20_4$ transmits a result of the test in which an error has occurred therein to the NM $20_1$.

A series of tests from sequence SQ5 to sequence SQ16 are periodically executed. In this case, each of the PC recognizes that a loop direction of the NC $20_4$ is erroneous through a loop-directional faulty station number area in the two-port RAM 22, so that it is understood that cables A and B each connected to the NC$20_4$ are incorrectly connected thereto respectively. A user actually corrects the connection of the cables according to the incorrect connection described above.

After the connection is corrected, all the stations become normal in the test according to a series of main/auxiliary loops in the sequences from sequence SQ17 to sequence SQ28, and in sequence SQ29, the NM $20_1$ transmits a parallel-on instructing transmission frame to all the network control stations using the main loop to restart the transmission/receiving.

Similarly, in sequence SQ30, the NM $20_1$ transmits a parallel-on instructing transmission frame thereto through the auxiliary loop. At this point of time, the PC $10_1$, PC $10_2$, PC $10_3$, and PC $10_4$ connected to the NM $20_1$, and the NC $20_2$, NC $20_3$, and NC $20_4$ restart ordinary transmission/receiving, and start ordinary transmission in sequence SQ31 respectively.

Next description is made for operations of the PC, NM, and NC each for realizing a sequence of transmission/receiving as described above with reference to FIG. 3 to FIG. 7.

Figure 3:
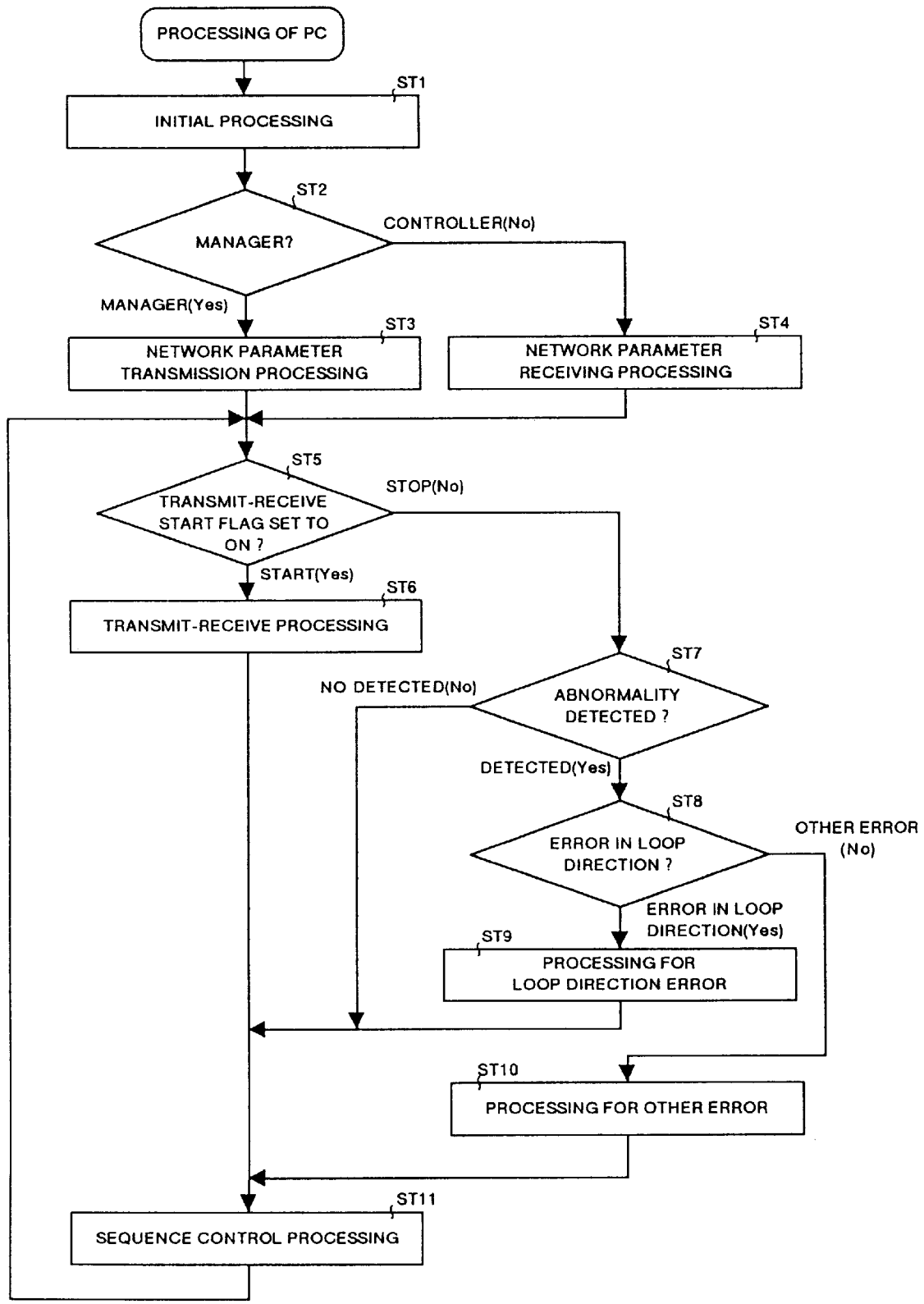
FIG. 3 is a flow chart showing processing operations of the programmable controller in the communication control method according to the present invention.

FIG. 3 shows an operating flow in each of the PCs (PC $10_1$, PC $10_2$, PC $10_3$, and PC $10_4$).

The PC 10 executes the initial processing whether the RAM 13, external I/F 14, and network unit 20 are correctly operating or not (step ST1), and determination is made as to whether the connected network unit is a network manager or a network controller (step ST2).

A network unit connected to the PC $10_1$ is the network manager (NM $20_1$), so that the PC $10_1$, executes a network parameter transmission processing for writing a network parameter in the network parameter area in the two-port RAM 22 (step ST3). Then, the network unit monitors a transmission/receiving start flag area in the two-port RAM 22, and determination is made as to whether the transmission/receiving has been started or not according to whether the transmission/receiving start flag has been set to ON or not (step ST5).

If it is determined that the transmission/receiving has been started (step ST5, affirmative), transmission/receiving with other station is executed via a transmit buffer and a receive buffer each allocated to the two-port RAM 22 (step ST6). After the step described above, a sequence control processing which is originally to be processed by the PC is executed (step ST11), and system control returns to step ST5.

In contrast, in a case where the transmission/receiving start flag is set to OFF (step ST5, negative), contents of the status area in the two-port RAM 22 is checked (step ST7), and in a case where the flag has been set to OFF due to any error (step ST7, affirmative), determination is made as to whether the error is one in the loop direction or not (step ST8).

If it is determined that the error is one in a loop direction (step ST8, affirmative), the error is regarded as a loop direction error, and a loop direction error processing such as reporting the loop-directional fault and the loop-directional faulty station number area or the similar information to a peripheral device often used under the control by the PC or a personal computer via the external I/F 14 is executed (step ST9). Then, the sequence control processing which is originally to be processed by the PC is executed (step ST11), and system control returns to the step ST5.

In a case where the PC has been disabled due to any other type of error (step ST8, negative), an appropriate operation for troubleshooting is executed (step ST10), then the sequence control processing which is originally to be processed by the PC is executed (step ST11), and then system control returns to step ST5. In a case where no error has occurred in the PC (step ST7, negative), after the step described above, the sequence control processing which is originally to be processed by the PC is executed (step ST11), and then system control returns to step ST5.

By repeating the processing sequence described above, the PC $10_1$ repeats execution of the processing sequence and transmission/receiving with other station.

As the network controllers (NC $20_2$ to NC $20_4$) are connected to the PC $10_2$ to PC $10_4$ respectively, a control unit is selected according to the determination in step ST2 in the PC $10_2$ to PC $10_4$, and the network parameter is fetched from the network parameter area in the two-port RAM 22 (step ST4). Then, the processing is executed successively from that in step ST5 like in the PC $10_1$, and sequence control and transmission/receiving with other station are executed like in the PC $10_1$.

Figure 4:
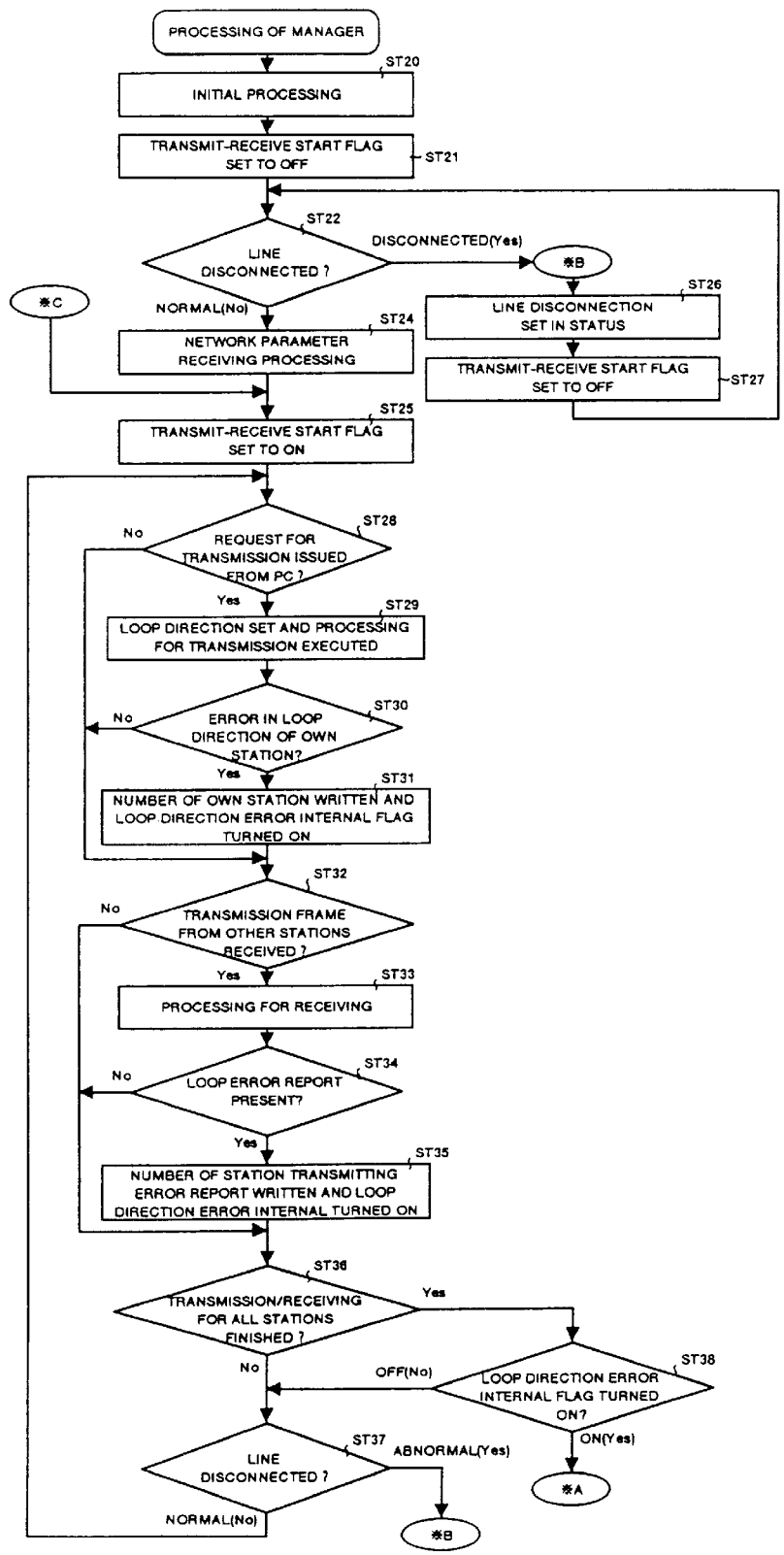
FIG. 4 is a flow chart showing a first section of processing operations of the network manager in the communication control method according to the present invention.
Figure 5:
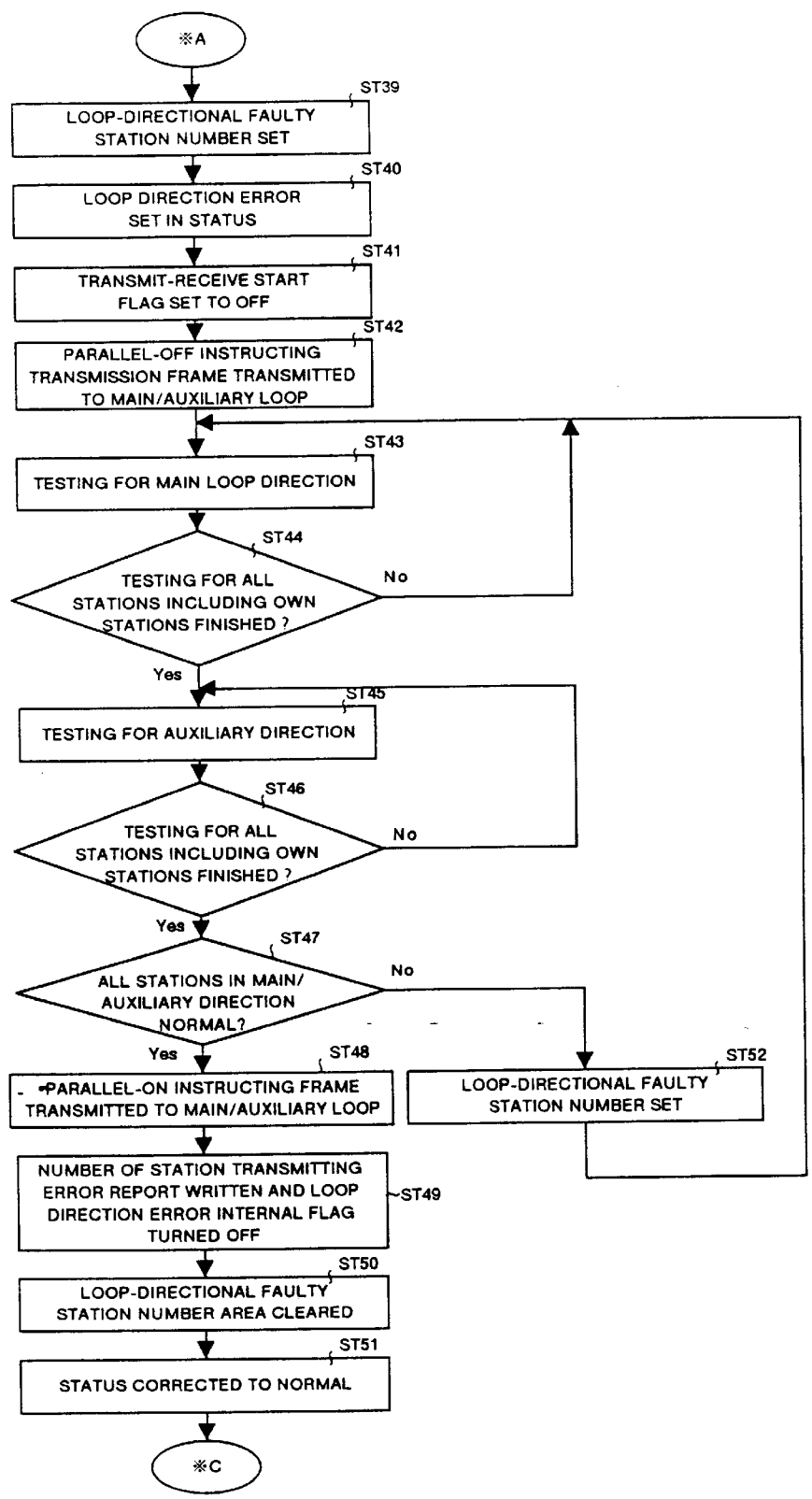
FIG. 5 is a flow chart showing a second section of processing operations of the network manager in the communication control method according to the present invention.

FIG. 4 and FIG. 5 show an operating flow of the network manager NM $20_1$ respectively.

The NM $20_1$ executes the initial processing as to whether the RAM 24 and network I/F 25 correctly operate or not or the like (step ST20), and a transmission/receiving start flag stored in the transmission/receiving start flag area in the two-port RAM 22 is set to OFF (step ST21).

Next determination is made thereby as to whether both lines in the main and auxiliary loops is in a state in which the NM $20_1$ can not execute communication with other stations due to disconnection of the lines or not (step ST22), and if it is determined that the NM $20_1$ can not execute communication with other stations due to disconnection thereof (step ST22, affirmative), the NM $20_1$ sets a line disconnection error in the status area of the two-port RAM 22 (step ST26), sets the transmission/receiving start flag in the two-port RAM 22 to OFF (step ST27), and repeats the operations from step ST22 until the lines are restored to the normal state.

In contrast, in a case where the lines are in the normal state (step ST22, negative), the NM $20_1$ transmits network parameters stored in the network parameter area in the two-port RAM 22 to other stations from the PC $10_1$ (step ST24).

Then, to report that communication with other station has been started to the PC $10_1$, the NM $20_1$ sets a transmission/receiving start flag in the two-port RAM 22 to ON (step ST25).

After the step, the NM $20_1$ recognizes whether a request for transmission has been issued from the PC $10_1$, or not by checking the transmit buffer in the two-port RAM 22 (step ST28), and if transmission has been requested (step ST28, affirmative), the NM $20_1$ sets a flag indicating a loop direction in a transmission frame, and executes transmission through the set loop (step ST29).

Then, the NM $20_1$ checks the loop direction indicated by the flag set in the transmission frame sent in step ST29 with the loop received by a station (step ST30), and if there is any error therein (step ST30, affirmative), writes the number of the station in the RAM 24 as a temporary memory, and turns ON a loop direction error internal flag (step ST31).

Then, the NM $20_1$ checks whether any transmission frame has been received from other stations or not (step ST32), and if it is determined that a transmission frame has been received, the NM $20_1$, executes the receiving processing for setting the received data in a receive buffer of the two-port RAM 22 (step ST33). Also the NM $20_1$ checks whether a loop error report has been added to the received transmission frame or not (step ST34), and if the loop error report has been added thereto (step ST34, affirmative), the NM $20_1$ writes the number of the station sending thereto the error report in the RAM 24 as a temporary memory, and turns ON the loop direction error internal flag (step ST35).

The NM $20_1$ checks whether one round of transmission and receiving to and from all the stations each constituting the system has been completed or not, namely, checks whether confirmation of the loop direction is executed for all the stations or not (station ST36), and if transmission or receiving is incomplete (step ST36, negative), then the NM $20_1$ further checks whether there is any error in the lines due to disconnection thereof or the like during the communication or not (step ST37), and if it is determined that the line is in the normal state (step ST37, negative), system control returns to the step ST28, and if it is determined that the line is not in the normal state (step ST37, affirmative), system control advances to the step ST26.

If the confirmation of the loop direction for all the stations is completed (step ST36, affirmative), the NM $20_1$ checks whether there is any error in the loop direction in any station or not according to whether the loop direction error internal flag is ON or not (step ST38), if it is determined that the loop direction is normal, namely the flag is OFF (step ST38, negative), system control goes to step ST37 and the NM $20_1$ checks therein whether there is any error in the lines due to disconnection thereof or the like or not, and if it is determined that the line is in the normal state (step ST37, negative), system control returns to step ST28, while if it is determined that the line is in the abnormal state (step ST37, affirmative), system control goes to step ST26.

If there is a loop direction error even in one station, namely if the flag is ON (step ST38, affirmative), the NM $20_1$ sets, to report the error to the PC $10_1$, all the numbers of the stations in which an error has been detected in the loop-directional faulty station number area of the two-port RAM 22 (step ST39), sets the error indicating the loop direction error in the station area of the two-port RAM 22 (step ST40), and sets the transmission/receiving start flag to OFF (step ST41). With this operation, detection is made as to whether any error has occurred in the PC $10_1$ described in the flow chart sown in FIG. 3 or not.

Then, the NM $20_1$ reports the error in the loop direction to NC $20_2$, NC $20_3$, and NC $20_4$, and executes testing as to whether the cable has been restored to the normal state or not.

When the error in the loop direction is to be reported thereto and the testing is to be executed, at first, the NM $20_1$ transmits a parallel-off instructing transmission frame indicating that an error has occurred in the loop direction and also the number of the station in which the error has occurred to the NC $20_2$, NC $20_3$, and NC $20_4$ through both of the main and auxiliary loops (step ST42). Transmission is executed through both of the loops so that the occurrence of the error can be reported to all the NCs even if one of the loops has been disabled due to such a failure as disconnection of a line.

Then the NM $20_1$ executes a testing for a loop direction, at first, in relation to the main loop side to check whether a loop direction is correct or not (step ST43). Herein, transmission of the loop direction testing frame to the NC $20_2$, NC $20_3$, and NC $20_4$ and receiving of the loop direction testing result frame from each of the NC $20_2$, NC $20_3$, and NC $20_4$ which corresponds to the operations from sequence SQ5 to sequence SQ10, are repeated. Like in step ST30, the NM $20_1$ executes the testing for each of the NCs and at the same time checks the loop direction in the station under control by the NM itself.

The NM $20_1$ checks whether the testing for the own station as well as for all the NC stations has been completed or not (step ST44), and if it is determined that the testing is still incomplete (step ST44, negative), system control returns to step ST43, and the testing for the main loop direction is repeated. In contrast, if it is determined that the testing is complete (step ST44, affirmative), then testing for the auxiliary loop side is executed for all the stations including the station under control by the NM itself like that in the main loop side (step ST45, step ST46).

When the testing for both the main and auxiliary loops has been completed for all the stations, the NM $20_1$ checks whether the error in the loop direction has been corrected in all the stations or not (step ST47), and if there is even one station in which the error has not been corrected (step ST47, negative), the NM $20_1$ sets the current state in the loop-directional faulty station number area of the two-port RAM 22 (step ST52), reports how the cables are connected to the PC $10_1$, and repeats the operations from step ST43 up to restore the state in the station to the normal one.

When the cables are correctly connected, and a result of the testing for both the main and auxiliary loops for all the stations is normal (step ST47, affirmative), the NM $20_1$ transmits a parallel-on instructing transmission frame to all the NCs through both the main/auxiliary loops in order to report the recovery thereto (step ST48), turns OFF the number of the faulty station and the loop direction error internal flag each inside thereof (step ST49), clears the loop-directional faulty station number area of the two-port RAM 22 (step ST50), the description in the status area of the two-port RAM 22 is corrected to the normal to report the recovery to the PC $10_1$ (step ST51), returns to step ST25 for setting the transmission/receiving start flag to a start, and then system control returns to the normal transmission/receiving state.

By repeating the operations described above, the network manager NM $20_1$ executes communications with the PC $10_1$ as well as with other stations.

Figure 6:
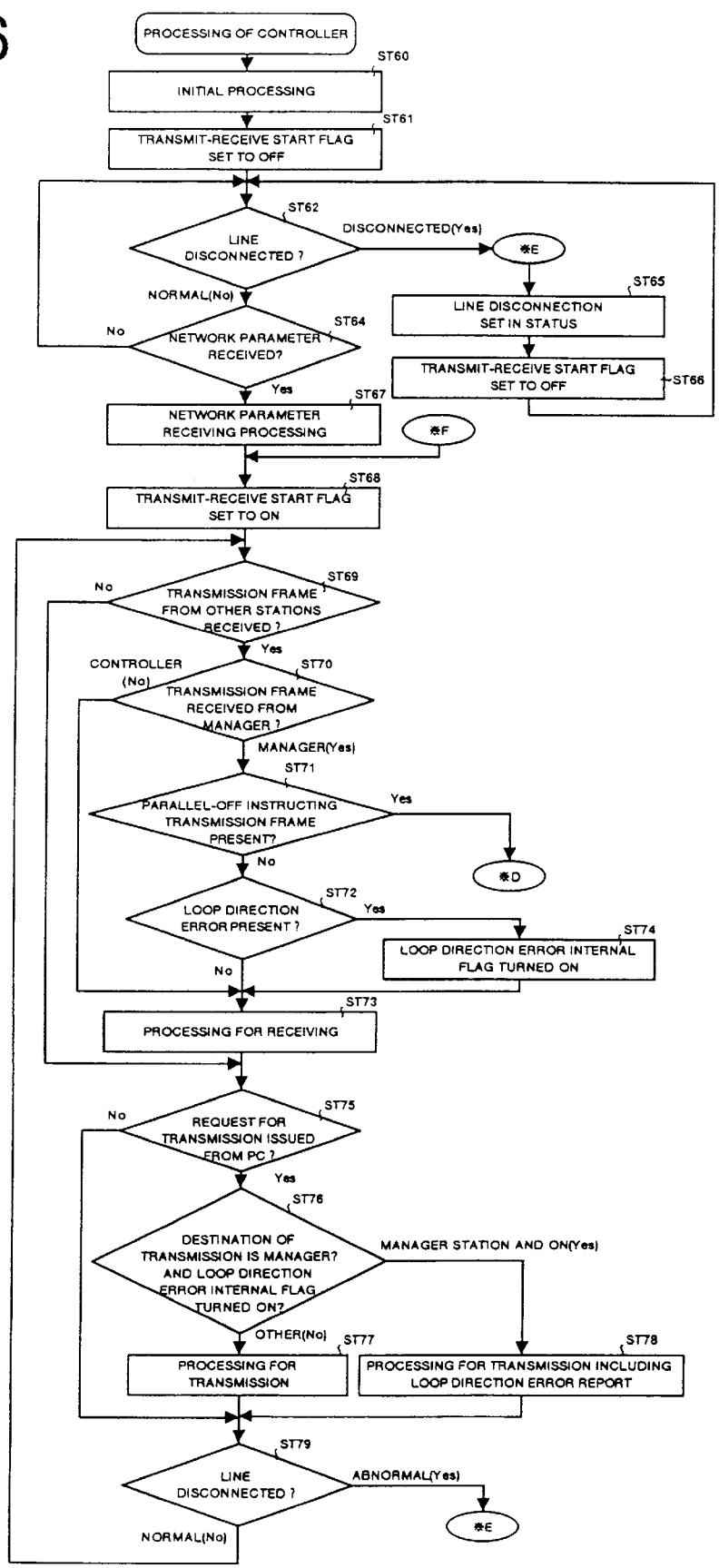
FIG. 6 is a flow chart showing a first section of processing operations of the network controller in the communication control method according to the present invention.
Figure 7:
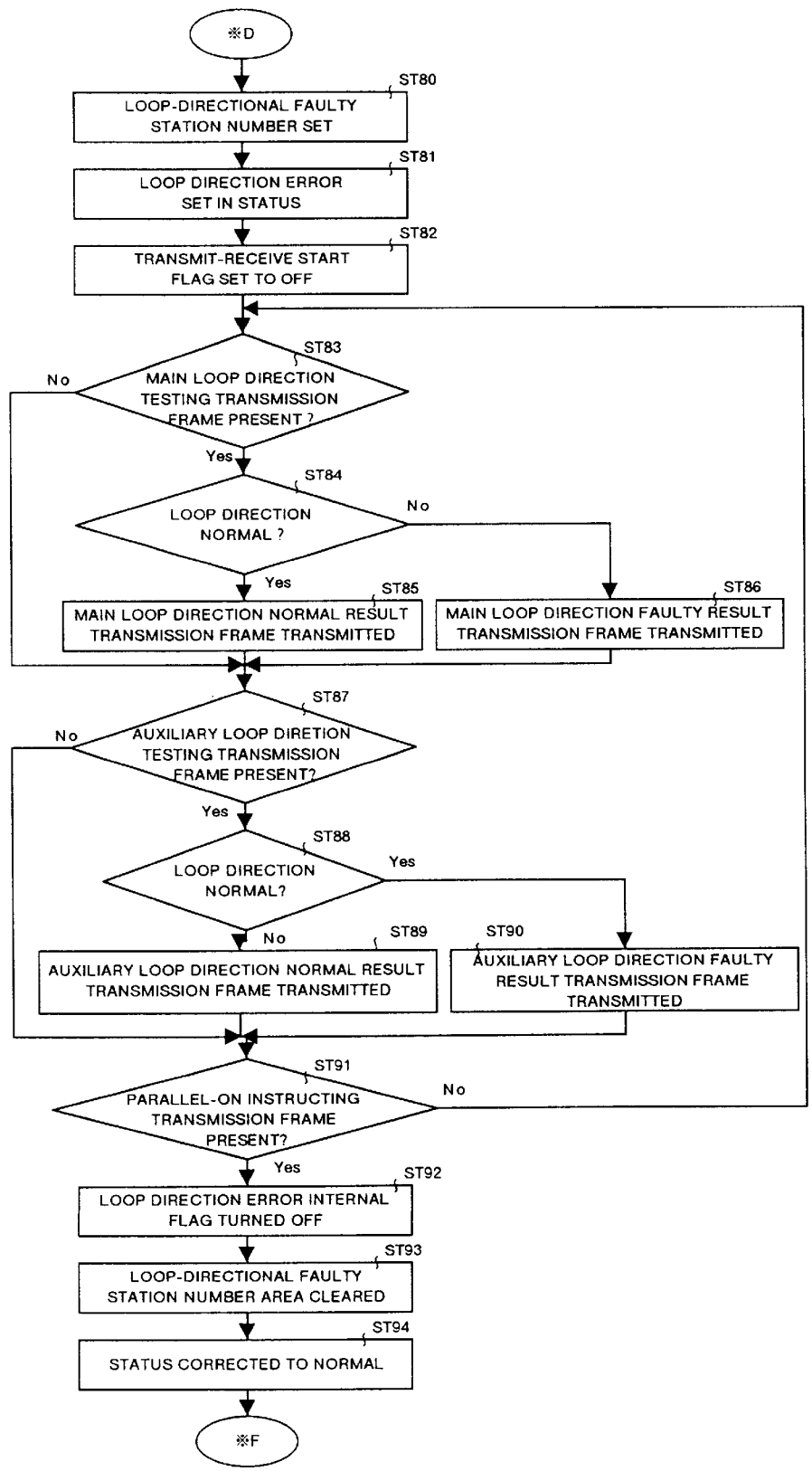
FIG. 7 is a flow chart showing a second section of processing operations of the network controller in the communication control method according to the present invention.

FIG. 6 and FIG. 7 show an operating flow of the network controllers NC $20_2$ to NC $20_4$.

Each of the NC $20_2$ to NC $20_4$ executes an initial processing such that the RAM 24 and the network I/F 25 correctly operate (step ST 60), and sets a transmission/receiving start flag stored in the transmission/receiving start flag of the two-port RAM 22 to be disabled (step ST61).

Then, determination is made as to whether communication with other stations can not be executed due to disconnection of both lines in the main and auxiliary loops or the like or not (step ST62), and in a case where the communication can not be executed with other stations due to the disconnection thereof or the like (step ST62, affirmative), a line disconnection error is set in the status area of the two-port RAM 22 (step ST65), and the transmission/receiving start flag of the two-port RAM 22 is set to OFF (step ST66), and the operations are repeated from step ST62 until the line is restored to the normal state.

If it is determined that the line is in the normal (step ST62, negative), it is checked whether each of the NCs has received network parameters from the NM $20_1$ (step ST64), and if it has not received yet the parameter (step ST64, negative), system control returns to step ST62.

In contrast, if the NC has received the parameter (step ST64, affirmative), the NC executes processing for receiving of the network parameters for storing the network parameters in the network parameter area of the two-port RAM 22, and transfers the parameters to the station PC under control by the PC (step ST67).

Then, a transmission/receiving start flag of the two-port RAM 22 is set to ON in order to report that communication with other station has been started to the station PC under control by the PC (step ST68).

Then, it is checked whether there is any received transmission frame from other station or not (step ST69), and if the NC has received a frame (step ST69, affirmative), the NC checks whether the received frame is from the NM $20_1$ or not (step ST70). If any frame has been sent from the NM $20_1$ (step ST70, affirmative), whether the received transmission frame is a parallel-off instructing transmission frame to disable the transmission/receiving or not is checked (step ST71).

If the frame is one other than the parallel-off instructing transmission frame (step ST71, negative), the NC checks the loop direction indicated by the loop direction flag in the actually received transmission frame and a loop through which the frame was actually received (step ST72), and if the two loop directions are different from each other (step ST72, affirmative), a loop direction error internal flag is turned ON (step ST74).

If the transmission frame has been received from other NC (step ST70, negative) or from the NM $20_1$ (step ST70, affirmative), so long as the transmission frame is other than a parallel-off instructing transmission frame (step ST71, negative), the NC executes the processing for setting the received data in the receive buffer of the two-port RAM 22 irrespective of whether a loop direction error has occurred or not (Step ST73).

The NC checks whether a request for transmission has been received from the station PC under control by the NC itself by checking the transmit buffer of the two-port RAM 22 (step ST75), and if the transmission request has been sent from the station (step ST75, affirmative), the NC checks whether the destination of the transmission is the NM $20_1$ and the loop direction error internal flag is ON or not (sep ST76), and if so (step ST76, affirmative), the NC transmits a transmission frame including therein the number of the station indicating an error therein and an error report indicating the loop direction to the NM $20_1$ (step ST78). If the request is one other than the request for transmission (step ST76, negative), the ordinary transmission processing is executed (step ST77).

The NC checks whether any error has occurred in the lines due to disconnection thereof or the like during the communication or not (step ST79), and if the lines are correctly connected (step ST79, negative), system control returns to step ST69, while if the lines are not correctly connected (step ST79, affirmative), system control goes to step ST65.

In step ST71, in a case where a parallel-off instructing transmission frame for executing parallel-off through either one of the loops or from both of the loops is received from the NM $20_1$, all the numbers of stations, in which the loop direction error has occurred, added to the parallel-off instructing transmission frame are set in the loop-directional faulty station number area of the two-port RAM 22 (step ST80), an error indicating the loop direction error is set in the status area of the two-port RAM 22 (step ST81), and the transmission/receiving start flag is disabled (step ST82).

Then the NC responds to a result of the testing sent from the NM $20_1$ for checking whether the cables are correctly connected or not.

When responding to a result of the testing, at first, the NC checks whether a loop direction checking test transmission frame has been received through the main loop side (step ST83), and if the frame has been received (step ST83, affirmative), the NC checks the loop direction indicated by the loop direction flag in the actually received transmission frame and the loop through which the transmission frame was actually received (step ST84), and if it is determined that the two loops are identical (step ST84, affirmative), a loop direction testing result frame with a result of the testing as to whether the main loop direction is normal or not is transmitted to the NM $20_1$ (step ST85). If it is determined that the two loops are not identical (step ST84, negative), a loop direction testing result frame with a result of the testing for abnormality in the main loop direction added thereto is transmitted to the NM $20_1$ (step ST86).

Similarly, the same types of checking for the auxiliary loop are executed in step ST87 to step ST90.

Then, checking is executed as to whether the NC has received a parallel-off instructing transmission frame through both of the loops or through either one of the loops (step ST91). If the parallel-on instructing transmission frame has not been received (step ST91, negative), system control repeats the operations from step ST83 because the cables are not correctly connected.

If the NC has received the parallel-on instructing transmission frame (step ST91, affirmative), the cables are correctly connected, so that the NC turns OFF the loop direction error internal flag inside thereof (step ST92), clears the loop-directional faulty station number area of the two-port RAM 22 (step ST93), the description in the status area of the two-port RAM 22 is corrected to the normal to report the recovery to the own station PC (step ST94), returns to step ST68 for setting the transmission/receiving start flag to a start, and then system control returns to the normal transmission/receiving state. By repeating the operations described above, each of the network controllers NC $20_2$ to $20_4$ executes communications with the own station PC as well as with other stations.

As understood from the above description, with the communication control method in a network system according to the present invention, it is possible to check whether a cable is correctly connected thereto or not by checking a loop direction when an ordinary transmission frame is received, so that any loop error can accurately be found without requiring any particular configuration of hardware.

With the communication control method in a network system according to another feature of the invention, when a cable is not correctly connected thereto, the network manager and all the network controllers can disable a request for transmission/receiving from FA equipment, so that an ordinary communication with FA equipment such as a programmable controller or the like can quickly be disabled when any error occurs in any loop.

With the communication control method in a network system according to another feature of the present invention, the number of a faulty station is reported to the FA equipment connected to the network manager, so that it is possible to check which station is not correctly connected thereto with the cable, and for this reason, a recovering work of cable connection can quickly and accurately be executed.

In the communication control method in a network system according to another feature of the present invention, the number of a faulty station is reported to the FA equipment connected to the network controller, so that it is possible to check which station is not correctly connected thereto with the cable, and for this reason, a recovering work of cable connection can quickly and accurately be executed.

In the communication control method in a network system according to another feature of the present invention, it is possible to check whether connection of all the stations with the cable is corrected or not by periodically executing a loop direction test after a loop error is recognized, so that checking can quickly be executed as to whether cable connection for all the stations has been restored to the normal state or not.

In the communication control method in a network system according to another feature of the present invention, when the connection of all the stations with the cable has been recovered, an instruction that the loop direction error has been recovered is issued to the FA equipment, so that an ordinary communication can quickly be restarted by means of recovery of the loop direction error.

This application is based on Japanese patent application No. HEI 8-238872 filed in the Japanese Patent Office on Sep. 10, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication control method for a network system comprising a plurality of stations which are interconnected via a transmission path forming a duplex loop arrangement, wherein each of said plurality of stations comprises a network controller connected to a programmable controller for executing communications between the plurality of stations and one of said plurality of stations comprises a network manager for controlling communications between said plurality of stations and monitoring wiring conditions of the duplex loop, the method comprising the steps of:

setting a flag in a transmission frame indicating a transmitting direction in the loop by the network manager when the network manager receives a request for transmission from a programmable controller of a station, and transmitting the transmission frame to other stations; and receiving at a network controller of one of the stations the transmission frame with the flag indicating the transmitting direction in the loop, comparing the loop through which said transmission frame was actually received to the transmission direction in the loop indicated by the flag in the received transmission frame, and transmitting to the network manager a transmission frame including an error report indicating the loop direction in which the transmission frame was received when the loop through which the transmission frame was actually received is different from the transmission direction in the loop indicated by the flag.

2. A communication control method according to claim 1, further comprising:

receiving, at the network manager, the transmission frame including the error report from the network controller, or receiving a transmission frame with a flag set therein indicating a transmission direction in the loop of the transmission frame from a station, comparing the loop through which the transmission frame from the network controller was actually received with the loop direction indicated by the flag in the received transmission frame, and disabling a request for transmission/receiving from the programmable controller, transmitting to the network controllers a parallel-off instructing transmission frame for reporting a wiring fault in the network to all the network controllers; and disabling at the network controller of each of said plurality of stations a request for transmission from the programmable controller when the network controller receives the parallel-off instructing transmission frame from the network manager in a case where the actually received loop is different from the loop direction indicated by the flag in the received transmission frame.

3. A communication control method according to claim 2 further comprising:

periodically transmitting, by the network controller, a loop direction testing transmission frame to the network controller, after a parallel-off instructing transmission frame is sent to the network controller, for testing in each line whether the wiring fault has been corrected; and checking, at the network controllers, the loop direction when the network controller receives the loop direction testing transmission frame for each line from the network manager, and transmitting a loop direction testing result transmission frame indicating a result of the check to the network manager.

4. A communication control method according to claim 3, further comprising:

checking, by the network manager, the loop direction testing result transmission frame from the network controller for each line, transmitting a parallel-on instructing transmission frame to each network controller in a case where an error in all stations including the station which has issued a request for transmission has been corrected, and restarting transmission of a request for transmission/receiving from the programmable controller; and restarting transmission, by the network controller, a request for transmission from the programmable controller when the network controller receives the parallel-on instructing transmission frame.

5. A communication control method according to claim 1, wherein said transmission frame including an error report includes a number of the station in which an error has occurred, and the method further comprising:

comparing, by the network manager when the network manager receives a transmission frame including the error report from any of the network controllers or a transmission flame with a flag set therein and indicating a loop direction transmitted from a station, the loop direction actually received with the loop direction indicated by the flag in the received transmission frame, and reporting the faulty station to the programmable controller in a case where the loop actually received is different from the loop direction indicated by the flag.

6. A communication control method according to claim 5, further comprising:

transmitting a parallel-off instructing transmission frame to the network controller from the network manager;

periodically transmitting from the network manager a loop direction testing transmission frame for testing in each line whether the wiring fault has been corrected or not to the network controller; and checking, at the network, the loop direction when the network controller receives the loop direction testing transmission frame for each line from the network manager, and transmitting a loop direction testing result transmission frame indicating a result of the check to the network manager.

7. A communication control method according to claim 6, further comprising:

checking, by the network manager, the loop direction testing result transmission frame from the network controller for each line, and transmitting a parallel-on instructing transmission frame to each network controller in a case where an error in all stations including the station which has issued a request for transmission has been corrected, restarting transmission of a request for transmission/receiving from the programmable controller; and issuing, from the network controller, a request for transmission from the programmable controller when the network controller receives the parallel-on instructing transmission frame.

8. A communication control method according to claim 6, wherein said parallel-off instructing transmission frame includes a number of a station in which an error has occurred, and the network controller reports the number of the faulty station to the programmable controller when the network controller receives a parallel-off instructing transmission frame from the network controller.

9. A communication control method according to claim 8, further comprising:

periodically transmitting from the network manager, after a parallel-off instructing transmission frame is sent to the network controller, a loop direction testing transmission frame for testing in each line whether the wiring fault has been corrected to the network controller; and checking, at the network controller, the loop direction when the network controller receives the loop direction testing transmission frame for each line from the network manager, and transmitting a loop direction testing result transmission frame indicating a result of the check to the network manager.

10. A communication control method according to claim 9, further comprising:

checking, at the network manager, the loop direction testing result transmission frame from the network controller for each line, and transmitting a parallel-on instructing transmission frame to each network controller in a case where an error in all stations including the station which has issued a request for transmission has been corrected, and restarting transmission of a request for transmission/receiving from the FA equipment; and issuing, at the network controller, a request for transmission from the the programmable controller when the network controller receives the parallel-on instructing transmission frame.

* * * * *